Nov. 15, 1955   C. T. ZAVALES   2,724,073
TESTING DEVICES
Filed Feb. 29, 1952   3 Sheets-Sheet 1
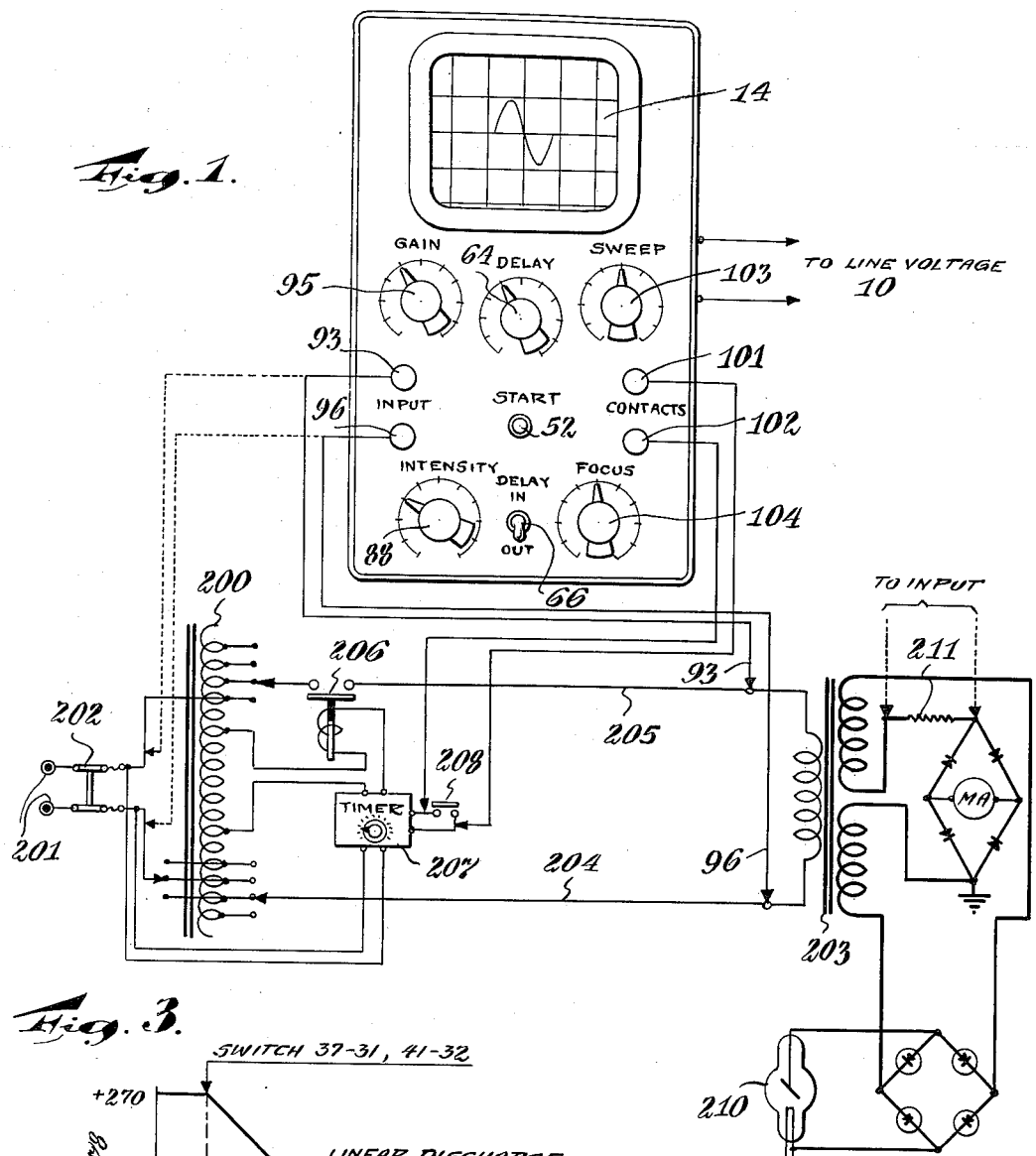
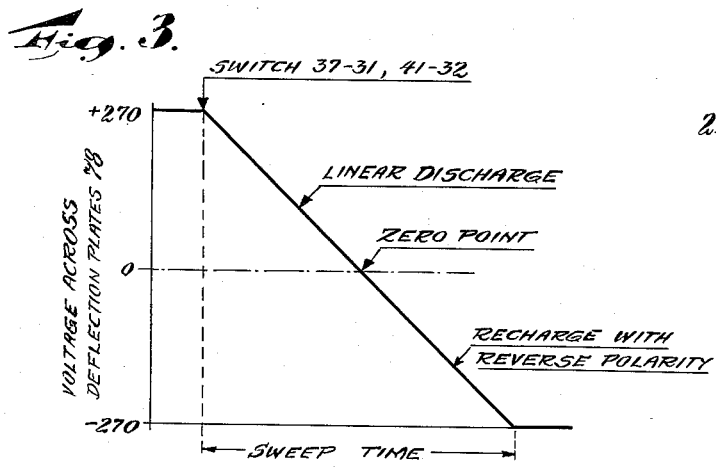
INVENTOR
C. T. ZAVALES
BY
Angelo M. Pisarra
ATTORNEY Nov. 15, 1955  C. T. ZAVALES  2,724,073
TESTING DEVICES
Filed Feb. 29, 1952  3 Sheets-Sheet 2

INVENTOR
C. T. ZAVALES
BY
Angelo M. Pisarra
ATTORNEY

Nov. 15, 1955  C. T. ZAVALES  2,724,073
TESTING DEVICES
Filed Feb. 29, 1952  3 Sheets-Sheet 3

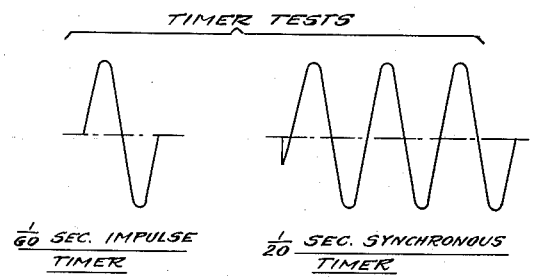

Fig. 4.
TIMER TESTS
1/60 SEC. IMPULSE TIMER   1/20 SEC. SYNCHRONOUS TIMER

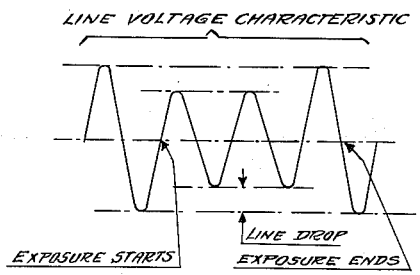

Fig. 5.
LINE VOLTAGE CHARACTERISTIC
EXPOSURE STARTS   LINE DROP   EXPOSURE ENDS

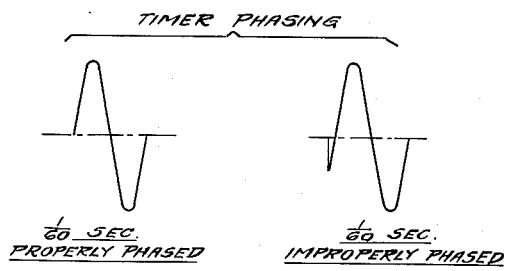

Fig. 6.
TIMER PHASING
1/60 SEC. PROPERLY PHASED   1/60 SEC. IMPROPERLY PHASED

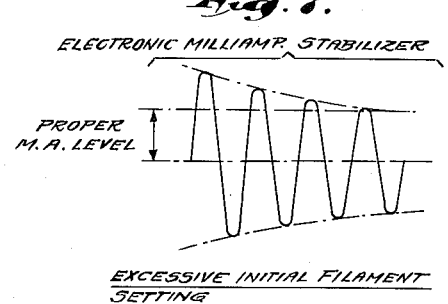

Fig. 7.
ELECTRONIC MILLIAMP. STABILIZER
PROPER M.A. LEVEL
EXCESSIVE INITIAL FILAMENT SETTING

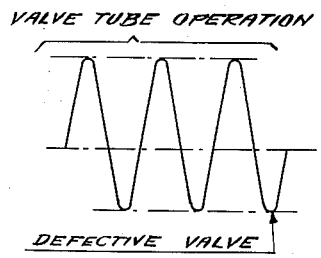

Fig. 8.
VALVE TUBE OPERATION
DEFECTIVE VALVE

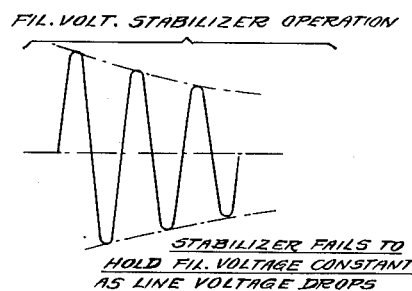

Fig. 9.
FIL. VOLT. STABILIZER OPERATION
STABILIZER FAILS TO HOLD FIL. VOLTAGE CONSTANT AS LINE VOLTAGE DROPS

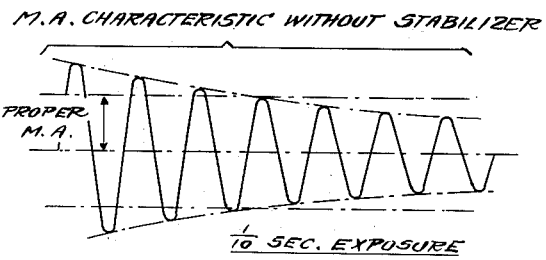

Fig. 10.
M.A. CHARACTERISTIC WITHOUT STABILIZER
PROPER M.A.
1/10 SEC. EXPOSURE

INVENTOR
C. T. ZAVALES.
BY Angelo M. Pisarro
ATTORNEY

United States Patent Office 2,724,073
Patented Nov. 15, 1955

2,724,073

TESTING DEVICES

Charles T. Zavales, New York, N. Y., assignor to F-R Machine Works, Woodside, Long Island, N. Y., a firm Application February 29, 1952, Serial No. 274,231

5 Claims. (Cl. 315—29)

This invention relates primarily to testing apparatus and more particularly to apparatus for checking transient phenomena. The apparatus of this invention finds especial utility in the fields of X-rays and electric spot welding.

In the X-ray field, for example, there are two problems, namely the exposure time and the voltage wave form on the primary of the high tension transformer at the time of the exposure; and in the welding field, there are also two main problems, the first concerns itself with the welding time and the second is the heat control.

The invention has been made to provide apparatus for studying the aforesaid problems. With the novel apparatus of this invention it is possible to check accurately the X-ray exposure time and also the phasing of mechanical or electronic timers which may have been used. With such accurate information made available by the use of this invention, proper measures may be taken with the X-ray mechanism so that exposure time and phasing may be accurately set and reset. With the novel apparatus, it also is possible to check line voltage drop under load, to check the operation of electronic or mechanical milliampere stabilizers, to check valve tube operation, to check filament voltage stabilizer operation, and to check photo-timer operation, etc.

According to this invention, I have provided a novel apparatus which may be employed for making all of the various tests heretofore set forth, as well as others, in a very simple and expeditious manner. The apparatus of this invention includes a cathode-ray tube having a persistent screen enabling visualization of transient phenomena for periods up to approximately 2 minutes after the phenomena has occurred, and also includes a manually operable start switch for simultaneously starting the phenomenon and the sweep of the electron beam of the cathode tube. The apparatus also includes a delay circuit for controlling the delay between the time the start switch is actuated and the time the sweep is initiated. This apparatus embodying said features is small and compact and is characterized by a novel rugged, simplified and comparatively reasonably priced circuitry. In addition, the sweep circuit per se is novel.

The apparatus of this invention, as well as the typical test patterns under various conditions of employment of the invention, are shown in the following drawings, wherein:

Fig. 1 is a diagrammatic illustration of a typical connection of novel apparatus with an X-ray circuit to be tested.

Fig. 3 shows the linearity of operation of the sweep circuit.

Figure 2:
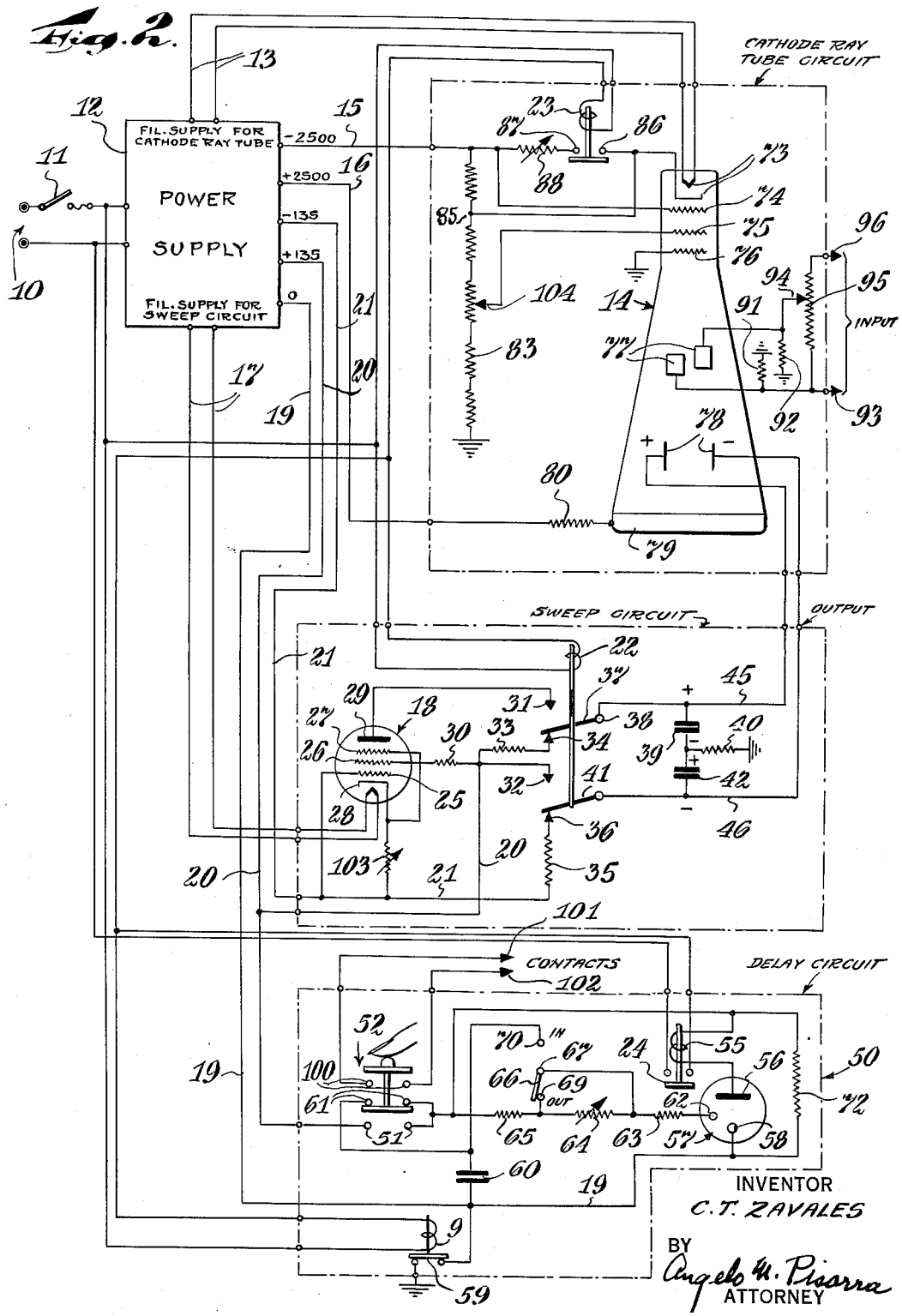
Fig. 2 is a wiring diagram of the invention.

Fig. 4—Fig. 10 illustrate various test patterns visually observable on the persistent screen of the cathode ray tube when the invention is employed for making particular tests on X-ray equipment.

As shown in the drawings, there is an alternating current 110-120 volt A. C. line 10 having a switch 11 therein. This line 10 is the input for the power supply 12 shown diagrammatically. The power supply 12 has a pair of output filament power supply lines 13 for the cathode of cathode ray tube 14; output power supply lines 15 and 16 are respectively maintained at −2500 and +2500 to provide accelerating voltages for the cathode ray tube 14. Filament power supply lines 17 energize the filament of a sweep generating tube 18 and power supply lines 19, 20 and 21 respectively maintained at approximately 0, +135 and −135 volts, for the sweep generator and delay circuits. A number of relays 9, 22 and 23 are arranged in parallel. In series with said relays and said input 10 is a normally open switch 24. The novel sweep circuit of this invention comprises the conductor 21 in series with a variable resistor 103 connected to the cathode of the sweep generating tube 28, which is essentially a pentode with grids 25, 26 and 27 and plate 29. The grid 25, which is the control grid, is connected to the conductor 21. The grid 26, which is a screen grid, is connected to the conductor 20 through a resistor 30 which serves to set the screen voltage. The grid 27 is the suppressor grid and is connected to the cathode 28 of the tube 18. The anode 29 is connected to one contact 31 of a double pole double throw relay switch which is part of relay 22. Line 20 is connected to contact 32 of said double pole double throw relay switch. A current limiting resistor 33 is connected in series with line 20 and contact 34 of said double pole double throw switch. A current limiting resistor 35 is connected in series with line 21 and contact 36 of said double pole double throw switch. The common arm 37 of said switch is connected at its midpoint 38 to one side of a condenser 39 and the other side of the condenser is connected to ground through a current limiting resistor 40. A common arm 41 of said switch is connected at its midpoint to one side of a similar condenser 42 also in turn connected to the ground through resistor 40. A pair of conductors 45 and 46 are connected to the outside plates of the condensers 39 and 42 and serve as the output of this sweep circuit or generator.

The delay circuit 50 includes contacts 51 of a normally open switch 52 manually operable by a push button hereinafter described, and also a pair of contacts 61 normally closed by a bar of said switch. One of the contacts 51 is connected to line 20, and the other contact 51 and one of the contacts 61 are connected to one end of the operating coil 55 of a D. C. relay which in turn is connected to the anode 56 of a cold cathode thyratron 57. The cathode 58 of the thyratron is connected to line 19 which is at zero potential and which is grounded through a normally closed switch 59, part of the relay 9. A contact of the switch 59 is also in series with a timing condenser 60 which is in series with the other contact 61 of the switch 52. The thyratron has a control grid 62 in series with a current limiting resistor 63 and timing resistor 64 and timing resistor 65, which in turn is connected to those contacts 51 and 61 connected to coil 55. A manually operable single pole double throw switch 66 has one end connected to a contact 67 in turn connected to the midpoint of the resistors 63 and 64 while the other contacts 69 and 70 are respectively connected to timing resistor 65 and to the timing condenser 60. Shunted across the coil 55 and thyratron 57 is a discharge resistor 72.

The cathode ray tube circuit includes a filament 73, control and accelerating electrodes 74, 75 and 76, vertical deflecting plates 77 and horizontal deflecting plates 78 and a post accelerating anode 79. The post accelerating anode 79 is connected to the line 16 through a current limiting resistor 80. A voltage divider 83, comprising a number of resistors of different values, is connected to line 15 and to ground. The control grid 74 is connected to line 15. The accelerating electrode 75 is connected to a potentiometer 104 which is part of resistor 83 and the other accelerating electrode 76 is connected to ground and the cathode 73 is connected to a suitable tap 85 of the resistor 83 and is also connected to one terminal 86 of a normally open switch, part of relay 23. The other contact 87 of said switch is connected through an intensity control resistor 88 in turn connected to the line 15. The vertical deflecting plates 77 are connected respectively to ground through grid leak resistors 91 and 92. One of the vertical deflecting plates 77 is connected directly to the input terminal 93 while the other deflecting plate 77 is connected to an arm 94 of a potentiometer 95, one end of which is connected to the terminal 93 and the other end is connected to a terminal 96. The horizontal deflecting plates 78 are connected to the output terminals 45 and 46 of the sweep generating circuit. Normally open contacts 100 which operate in tandem with switch 52 are connected to the terminals 101 and 102, which are the external control terminals.

The mode of operation is briefly as follows: First the switch 11 is closed so that the electric current supply 10, for example, 117 volt 50–60 cycles, is fed to the power supply 12. Immediately thereafter the filament 73 of the cathode ray tube 14 and the filament of the sweep generating tube 18 come to temperature, and the power supply 12 produces the voltages indicated on the lines 15, 16, 19, 20 and 21. In this manner, high voltage is applied to the electrodes of the cathode ray tube 14. Suitable voltages for the individual electrodes of said tube 14 are determined by the relative values of the voltage divider 83. The potential between the grid and the cathode of tube 14 is so chosen as to make the grid 74 of tube 14 sufficiently negative to prevent electrons from reaching the screen of tube 14. This makes the cathode ray tube 14 inactive at this time because the electron beam is thus effectively cut off. However, the beam may be made visible by reducing the magnitude of voltage between the grid 74 and cathode 73. The normally open contacts 86 and 87 and resistor 88 are so arranged to reduce the negative bias between the grid and the cathode so that the beam may become visible when the relay 23 is operated to close the contacts 86 and 87. The value of resistor 88 determines the intensity of beam current which flows in the tube 14 when the contacts 86 and 87 are closed.

In addition, as soon as switch 11 is closed the following happens in the sweep circuit: Condenser 39 is charged to plus 135 volts through line 20, resistor 33, closed switch 37 to one side of the condenser 39 and from the other side of the condenser 39 through resistor 40 to ground and through closed switch 59 to line 19 which is at zero potential. Condenser 42 is charged to minus 135 volts through line 21, resistor 35, closed switch 41, to one side of the condenser 42, and from the other side of the condenser 42 to the resistor 40 to ground through the closed switch 59 to the line 19 at zero potential. The total voltage across the series circuit of the condensers 39 and 42 is 270 volts. This arrangement effectively provides a center-tapped condenser arrangement for the deflecting circuit so that differences in potential between the plates 78 is 270 volts while the potential difference at the midpoint between those plates is approximately zero which is for the prevention of defocusing of the electron beam as it may be deflected from right to left in tube 14 by the horizontal plates 78.

The invention may be employed in a number of different ways. It is so flexible that it is possible to operate it in a number of ways. It may be set so that there will be no delay between operations in another way it may be set so that there will be a time delay between sequence of operations. When no time delay sequence of operation is desired, the switch 66 is disposed in the out position so that the time condenser 60 is completely out of circuit and the time delay resistor 64 is shunted out. (As shown in Fig. 2.)

Switch 52 is manually operated whereupon one of the bars thereof closes the contacts 100 to start the sequence of the phenomena to be studied when contacts 101 and 102 are connected to the device to be tested. Simultaneously another bar of that switch opens the normally closed contacts 61 and closes the contacts 51. When the contacts 51 are thus closed, plus 135 volts is supplied by line 20, through resistor 65 through switch 66 through resistor 63 to the grid 62 of the cold cathode thyratron whereupon ionization occurs and the tube becomes conductive instantly. Then current flows through the relay coil 55 thereby closing the switch of relay 24 whereupon the coils of relays 22 and 23 are simultaneously energized. Coil of relay 9 is energized, to open the normally closed switch 59 and at the same time relay 23 is energized to close the normally open contacts 86 and 87. The switch 59 is opened to break the connection between ground and line 19 which is at zero potential. When the contacts 86 and 87 are closed the negative bias on grid 74 is reduced so that the electron beam is permitted to reach the screen of tube 17 whereupon it becomes visible.

Energization of relay 22 causes swinging of the switch elements 41 and 37 away from contacts 34 and 36, whereby the condensers 39 and 42 are out of charge with respect to the power supply 12 and at the same time the elements 37 and 41 respectively are coupled to contacts 31 and 32. This connects the positive side of condenser 39 to the anode 29 of tube 18 and the negative side of condenser 42 to the power supply line 20. The voltage between the horizontal deflecting plates 78, which is the sum of the voltages of the two condensers 39 and 42, is shown diagrammatically in Fig. 3, and occurs between those plates 78 the instant that 37—31 and 41—32 come into contact. As soon as this occurs, the current starts to flow through the tube 18 which is a constant current tube. The magnitude of current flowing through said tube is controlled by the variable resistor 103. The current flows through said tube 18 and is furnished by the condensers 39 and 42 and because of this the voltage between these condensers will fall off at a linear rate as shown in Fig. 3. This action continues until the voltage across the condensers reaches a value equal to the initial value, except for a reverse in polarity as shown in Fig. 3. The slope of the linear discharge line represents the sweep time. By setting the variable resistor 103, there is provided a ready means for controlling the sweep time, it being observed that the length of the linear discharge line as shown in Fig. 3 may be lengthened or shortened depending upon the setting of that resistor.

The voltages of the condensers 39 and 42 are always equal to each other and of opposite polarity, are impressed upon the deflecting plates 78 which control the travel of the electron beam on the screen of the tube 14. Therefore, the potential between plates 78 is varied at said uniform rate which is linear, so that sweep of said beam on said screen is at a linear rate.

After the sweep of the beam on the persistent screen of the cathode-ray tube oscillograph 14 has been completed, a complete cycle of operation has occurred. The operator now releases the switch 52 so that the elements 37 and 41 automatically move away from contacts 31 and 32 respectively to break the condenser discharging and recharging circuit. After moving from contacts 31 and 32 respectively, said elements 37 and 41 automatically move to contacts 34 and 36 respectively to their original position as shown in Fig. 2 to again make the original condenser charging circuit as shown in said figure. When the condenser charging circuit is again made, the condensers 39 and 42 are directly across the center-tapped direct current power supply lines 20 and 21 whereupon they are charged almost immediately to voltages of the original value and polarities.

The circuit components may be so chosen that the sweep time may be varied over fairly wide limits, namely 1/200 of a second to approximately 2 seconds, for example. In this manner, it is also possible to obtain a wide range of time sweeps.

If it is desired to have a delayed operation, which is a predetermined time delay between the time that the contacts 101 and 102 are closed and the time that the beam becomes visible, that is possible with this invention. For this purpose the switch 66 is actuated to move it from contact 69 and into contact 70, whereupon the time condenser 60 and resistor 64 are now in circuit. In this case, the switch 52 is actuated to connect the 135 volt line 20 to closed contacts 51, through resistors 65, 64 and 63 to the grid 62 of the thyratron 57. When these contacts 51 are closed and contacts 61 are simultaneously opened, timing condenser 60 is prevented from being discharged through resistor 72 to ground and condenser 60 starts to charge from line 20 through contacts 51, resistor 64, variable timing resistor 64, switch 66, condenser 60, to ground through line 19 and its rate of charge is based upon the setting of the variable resistor 64. When the voltage at the condenser 60 reaches a predetermined value, the thyratron tube 57 becomes ionized and current flows through the relay 55 closing switch 24 whereupon the operation thereafter is as before described. The time delay between the time the contacts 101 and 102 are closed and switch 24 is closed is thus controlled and dependent upon the condenser 60 as controlled by the variable resistor 64.

The device whose voltage phenomena under study is connected to contacts 93 and 96 which are in turn connected through potentiometer 95 to the vertical deflecting plates 77 of tube 14. The magnitude of the voltage of tube 14 is controlled by the variable potentiometer 95.

A typical manner of use of the invention is herein set forth merely by way of illustration and not by way of limitation, because it is obvious to those in the art of the many other ways in which this invention might be employed. One such apparatus which may be subject to tests is an X-ray apparatus of a conventional design as shown in Fig. 1. This apparatus comprises a conventional auto-transformer 200 connected to input line 201 through switch 202. A high voltage transformer 203 has one side of its primary connected to auto-transformer 200 through line 204, and the other side of the primary is connected to said auto-transformer by line 205 through a normally open switch 206. Said switch 206 is operated by a conventional X-ray timer 207 receiving its supply from line 201 and having a conventional, normally open push button switch 208 for starting and controlling the exposure time of the X-ray tube which initiates the exposure, and which exposure in turn is controlled by the timer. An X-ray tube 210 is connected across the secondary of the high tension transformer in the conventional manner as shown, and including resistor 211 in the midpoint circuit of the high tension transformer. Assuming that it is desired to check accurately, the timer of an X-ray apparatus, the example of which was hereinbefore described. In that case, contacts 101 and 102 are connected to the respective contacts of the normally open switch 208 of said timer and contacts 93 and 96 are connected to the lines 204 and 205 which are the terminals of the primary of the high tension transformer. If the timer in question is of the type that does not have an operating time delay, for example, a synchronous timer, the delay switch 66 is located at the "out" position as shown. With the connections as described, operation of the start push button 52 will close contacts 51 and also contacts 100, whereby there is closed the timer push button switch within the X-ray control to initiate the X-ray exposure and at the same time the sweep beam boosting circuit within the test device will become operable, as hereinbefore described. The duration of the X-ray exposure, which will be dependent upon the setting of the timer in the X-ray equipment, will become visible and persist on the screen of the cathode ray tube 14 as the number of power frequency impulses that are across the primary of the high tension transformer. If the timer is set for 1/60 of a second the image which persists on the screen of the tube 14 for a sufficient length of time to be accurately observed by the tester, is that shown in the left hand view of Fig. 4, and if the image is that shown in the right hand view of Fig. 4, with the timer set at 1/20 of a second, this indicates that the timer is in proper condition. When a mechanical impulse timer is to be tested in such a circuit then the switch 66 is at the "in" position as shown so that there is a time delay in the operation of the test device of the invention. For impulse timer testing where close timing contacts must be made at the zero point of the voltage wave form, the test device provides the most valuable means of determining this condition. The ideal condition is that shown in the left hand view of Fig. 6, while the condition which sometimes exists and must be corrected is that shown on the right hand side of said figure. The wave form of the device may be obtained by employing this invention in conjunction with that particular type of timer. The line voltage regulation characteristic may be quickly determined by connecting contacts 93 and 96 directly across the line 201, as shown in Fig. 1 in dotted lines. A particular wave form showing excessive line voltage drop which is readily discernible by employing this invention is shown in Fig. 5. There is no known easy way of doing this now without very elaborate and costly laboratory equipment. The performance of electronic milliampere stabilizer, valve tube, filament voltage stabilizers, and milliampere characteristics without stabilizers may be ascertained as shown in Figs. 7–10 respectively, readily by connecting a viewing resistor 211 into the midpoint circuit in the secondary of the high tension transformer 203, and visualizing the above mentioned equipment performance the input terminals 93 and 96 are connected across the viewing resistor 211.

I claim:

1. In combination with a persistent screen cathode ray oscillograph having a pair of deflecting plates, of a sweep circuit comprising a pair of centertapped condensers connected across said plates, means for charging said condensers to voltages of equal values and of opposite polarities, means for discharging said condensers at a linear rate and for recharging said condensers at the same rate to voltages equal to and of opposite polarities to the voltages of said respective condensers at the beginning of said discharging for varying the voltage at each of said plates at a linear rate from its value and polarity to the same value and opposite polarity.

2. In combination with a persistent screen cathode ray oscillograph having a pair of deflecting plates, of a sweep circuit comprising a pair of centertapped condensers connected across said plates, means for charging said condensers to voltages of equal values and of opposite polarities, means for discharging said condensers at a linear rate and for recharging said condensers at the same rate to voltages equal to and of opposite polarities to the voltages of said respective condensers at the beginning of said discharging for varying the voltage at each of said plates at a linear rate from its value and polarity to the same value and opposite polarity, said last mentioned means including only a single constant current tube and means for varying the magnitude or current flow through said tube for controlling the rate of said discharging and recharging of said condensers for controlling the sweep time.

3. In combination with a persistent screen cathode ray oscillograph having a pair of deflecting plates, of a sweep circuit including a pair of condensers, means connectable to said condensers for charging said condensers to equal voltages of opposite polarities and said condensers connected to said plates for providing equal voltages of opposite polarities to said plates, means for connecting said first mentioned means to said condensers, means connectable to said condensers for discharging said condensers at a linear rate and for recharging said condensers at the same rate to voltages equal to and of opposite polarities to the voltages of the respective condensers at the beginning of said discharge, said last mentioned means including only a single constant current tube and a variable resistor for controlling the magnitude of current flow through said tube for controlling the linear rate of said discharging and recharging of said condensers for controlling the sweep time.

4. In combination with a persistent screen cathode ray oscillograph having a pair of deflecting plates, of a sweep circuit including a pair of centertapped condensers connected across said plates, a charging circuit for said condensers, said circuit including means for making and breaking said circuit, said condensers and a source of direct current power supply for charging said condensers to voltages of equal values and opposite polarities, a discharging and recharging circuit for discharging said condensers at a linear rate and recharging them at the same rate to voltages equal to and of opposite polarity to their voltages at the beginning of said discharging, said last mentioned circuit including in series said condensers, only a single constant current tube, said source of supply and means for making and breaking said circuit and means for controlling the magnitude of current flow through said tube to control said rate of discharging and recharging.

5. In combination with a persistent screen cathode ray oscillograph having a pair of deflecting plates, of a sweep circuit comprising a pair of centertapped condensers connected across said plates, means for making a circuit between said condensers and a source of direct current supply to charge said condensers to voltages of equal values and of opposite polarities and for breaking said circuit, only a single constant current tube and means for making a circuit between said constant current tube, said condensers and a source of direct current supply to discharge said condensers at a linear rate and to recharge said condensers at the same rate to voltages equal to and of opposite polarities to the voltages of said respective condensers at the beginning of said discharge for varying the voltage at a linear rate at each of said plates from its value and polarity at the beginning of said discharge to the same value and opposite polarities.

References Cited in the file of this patent

UNITED STATES PATENTS

| | | |
|---|---|---|
| 2,098,598 | Schroter | Nov. 9, 1937 |
| 2,209,199 | Gray | July 23, 1940 |
| 2,244,513 | Burton | June 3, 1941 |
| 2,259,284 | Baldwin | Oct. 14, 1941 |
| 2,458,366 | Fyler | Jan. 4, 1949 |